(12) United States Patent
Kurokawa

(10) Patent No.: US 8,403,546 B2
(45) Date of Patent: Mar. 26, 2013

(54) ILLUMINATING DEVICE

(75) Inventor: Kazumasa Kurokawa, Kariya (JP)

(73) Assignee: Denso Corporation, Kariya (JP)

( * ) Notice: Subject to any disclaimer, the term of this patent is extended or adjusted under 35 U.S.C. 154(b) by 324 days.

(21) Appl. No.: 12/876,471

(22) Filed: Sep. 7, 2010

(65) Prior Publication Data

US 2011/0075434 A1 Mar. 31, 2011

(30) Foreign Application Priority Data

Sep. 30, 2009 (JP) ................................. 2009-226257

(51) Int. Cl.
*B60Q 3/00* (2006.01)

(52) U.S. Cl. .................. 362/459; 362/97.1; 362/217.02; 362/97.2; 362/235

(58) Field of Classification Search .................. 362/235, 362/459, 97.1–97.3, 217.02; 359/676
See application file for complete search history.

(56) References Cited

U.S. PATENT DOCUMENTS

| | | | | |
|---|---|---|---|---|
| 6,454,449 | B2 * | 9/2002 | Nestell et al. ................. | 362/520 |
| 7,185,995 | B2 | 3/2007 | Hatanaka et al. | |
| 7,511,892 | B2 * | 3/2009 | Takato .......................... | 359/676 |
| 2006/0082692 | A1 | 4/2006 | Kamijima et al. | |
| 2006/0238889 | A1 * | 10/2006 | Nanba et al. .................. | 359/689 |

FOREIGN PATENT DOCUMENTS

| | | |
|---|---|---|
| JP | 5-104979 | 4/1993 |
| JP | 2006-184673 | 7/2006 |
| JP | 2005-228606 | 11/2006 |
| JP | 2006-318886 | 11/2006 |
| JP | 2007-108429 | 4/2007 |
| JP | 2009-170205 | 7/2009 |

OTHER PUBLICATIONS

Japanese Office Action dated Aug. 2, 2011, issued in corresponding Japanese Application No. 2009-226257 with English Translation.

* cited by examiner

*Primary Examiner* — Anabel Ton
(74) *Attorney, Agent, or Firm* — Nixon & Vanderhye P.C.

(57) ABSTRACT

An illuminating device includes a light source body and a lens array. The light source body includes a plurality of light sources. The lens array includes an opposed surface, a reverse surface, a plurality of lenses, a recess, and a projection. The plurality of lenses corresponds respectively to the plurality of light sources. The plurality of lenses includes a first lens and a second lens, which is located adjacent to the first lens. The recess is formed at an end portion of the first lens adjacent to the second lens. The projection is formed at an end portion of the second lens adjacent to the first lens. The projection is coupled with the recess, so that at least a part of a boundary line between the first lens and the second lens is formed in a concave-convex shape as a result of a combination of the recess and the projection.

13 Claims, 5 Drawing Sheets

ILLUMINATING DEVICE

CROSS REFERENCE TO RELATED APPLICATION

This application is based on and incorporates herein by reference Japanese Patent Application No. 2009-226257 filed on Sep. 30, 2009.

BACKGROUND OF THE INVENTION

1. Field of the Invention

The present invention relates to an illuminating device that includes a light source body having light sources, and a lens array having lenses which correspond respectively to the light sources.

2. Description of Related Art

Conventionally, in JP-A-05-104979, for example, a head up display with a halogen lamp used as a light source is proposed. In JP-A-2005-228606, an illumination device with a light emitting diode (LED) employed as a light source of a head up display is proposed.

According to the head up display described in JP-A-05-104979, light, which is irradiated from the halogen lamp, is condensed by an integrator lens, and a front panel is irradiated with the condensed light through a light receiving display element. Then, the light which is reflected by the front panel is delivered to a surveyor (observer).

In the head up display described in JP-A-2005-228606, light that is emitted from a light source body, in which LEDs are arranged, is collected by a lens array, and a front panel is irradiated with the collected light via a liquid crystal display panel. Then, the light which is reflected by the front panel is delivered to a user (observer).

As described above, in the head up display described in JP-A-05-104979, the halogen lamp is employed as a light source. Because the halogen lamp produces light due to heat radiation, besides visible light, infrared rays (heat ray) are included in this light. As a result, the light receiving display element is irradiated with the infrared rays together with the visible light. Accordingly, there is a possibility that the light receiving display element generates heat and is thereby damaged.

To resolve the above-described problem, in JP-A-2005-228606, the LEDs are employed as a light source. Since the LED emits light having wavelength corresponding to an energy gap (value inherent in a semiconductor) of a semiconductor, when the visible light is selected as the light of the LED, the infrared rays are not contained in the light applied by the LED. Therefore, the heat generation of the liquid crystal display panel (light receiving display element) due to the light applied by the light source is limited.

When the LED is used as the light source of the head up display, the LED has lower brightness than the halogen lamp. Accordingly, more than one LED needs to be prepared. In this case, an optical system for converging light irradiated by each LED in a one direction is necessary. In JP-A-2005-228606, the above-described lens array is adopted as an optical system having such a function.

The lens array described in JP-A-2005-228606 includes convex lenses for focusing the light irradiated from one LED. A surface of the lens array opposed to the LED has a flat surface shape. A reverse surface of this opposed surface is formed in such a shape that curved surfaces (convex lenses), which project on the reverse side, are joined together (see FIGS. 3 and 4 in JP-A-2005-228606). An optical axis of the LED and a vertex of the convex lens corresponding to this LED, coincide with each other. The light concentrated by the convex lens constitutes a brightness distribution with the vertex of the convex lens being peaked. The light having such a brightness distribution is emitted from each convex lens, and the observer is irradiated with these lights through the liquid crystal display panel and the front panel.

The brightness distribution of light varies according to an observing direction of the observer. The brightness distribution of light when a direction that is perpendicular to a luminescent surface of the LED is set at the observing direction will be described below.

In the brightness distribution of light emitted from one convex lens, brightness is the highest at the vertex of the convex lens, and the brightness becomes lower from the vertex toward a boundary line, which is formed between the one convex lens (curved surface) and a convex lens (curved surface) adjacent thereto. In this manner, when the brightness rapidly changes between the vertex of the one convex lens and the above-described boundary line, a brightness difference between the lights becomes marked. Furthermore, in the lens array shown in JP-A-2005-228606, the above boundary line has a linear shape, so that a region having the lowest brightness also has a linear shape. As described above, if the observer is exposed to the light, the brightness difference of which is prominent, and which includes brightness unevenness with the lowest-brightness region having a linear shape, the observer may recognize the lowest-brightness region as a fringe.

When the observer is irradiated with the light including the brightness unevenness, which may be recognized as a fringe by the observer (such a light is hereinafter referred to as a "light including a fringe" for the sake of simplicity), via the liquid crystal display panel and the front panel, the observer cannot easily visually identify light information indicated on the front panel.

Additionally, the brightness distribution of the light delivered to the observer depends on the observing direction (i.e., sight line direction) of the observer. Accordingly, in a certain observing direction, the observer is sometimes not irradiated with the light including a fringe. Nevertheless, since the observing direction of the observer is not constant, the observer eventually observes the light including a fringe. As a result, the observer cannot readily visually confirm the light information displayed on the front panel.

SUMMARY OF THE INVENTION

The present invention addresses at least one of the above disadvantages.

According to the present invention, there is provided an illuminating device including a light source body and a lens array. The light source body includes a plurality of light sources. The lens array includes an opposed surface, a reverse surface, a plurality of lenses, a recess, and a projection. The opposed surface is opposed to the light source body. The reverse surface is on a reverse side of the opposed surface. The plurality of lenses corresponds respectively to the plurality of light sources. The plurality of lenses includes a first lens and a second lens. The first lens has a first curved surface, which is formed on the reverse surface and projects on the reverse side. The second lens is located adjacent to the first lens and has a second curved surface, which is formed on the reverse surface and projects on the reverse side. The recess is formed at an end portion of the first lens adjacent to the second lens. The projection is formed at an end portion of the second lens adjacent to the first lens. The projection is coupled with the recess, so that at least a part of a boundary line between the first lens and the second lens is formed in a concave-convex shape as a result of a combination of the recess and the projection.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment when an illuminating device of the invention is applied to a head up display, will be described below with reference to FIGS. 1 to 7B. In the following description, a direction in which light emitting diodes (LEDs) 12 are arranged along a luminescent surface of the LED 12, is referred to as a direction X; a direction that is along the luminescent surface of the LED 12 and that is perpendicular to the direction X is referred to as a direction Y; and a direction perpendicular to the luminescent surface of the LED 12 is referred to as a direction Z.

Figure 1:
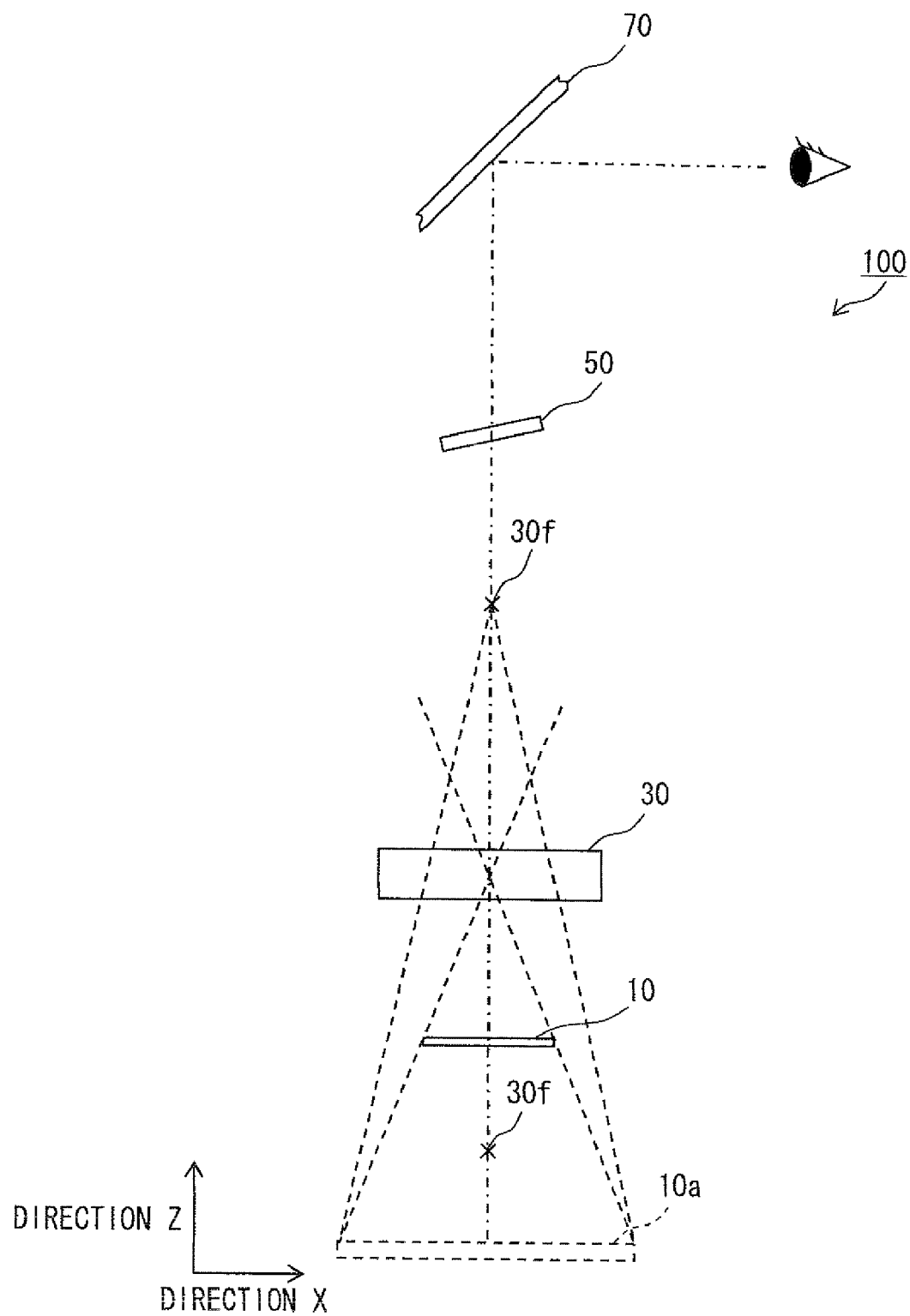
FIG. 1 is a sectional view illustrating a general configuration of a head up display in accordance with an embodiment of the invention.

As illustrated in FIG. 1, a head up display 100 includes a back light 10, a cylindrical lens 30, and a liquid crystal display panel 50, as its main features. The main components 10, 30, and 50 of the head up display 100 are arranged in the direction Z. The head up display 100 is disposed in a vehicle such that the light, which is irradiated from the back light 10, is reflected by a front panel 70 through the cylindrical lens 30 and the liquid crystal display panel 50 and that the reflected light enters into a pupil of an observer. In addition, the back light 10 is located on the cylindrical lens 30-side of a focal point 30f of the cylindrical lens 30 on the back light 10-side.

Figure 2:
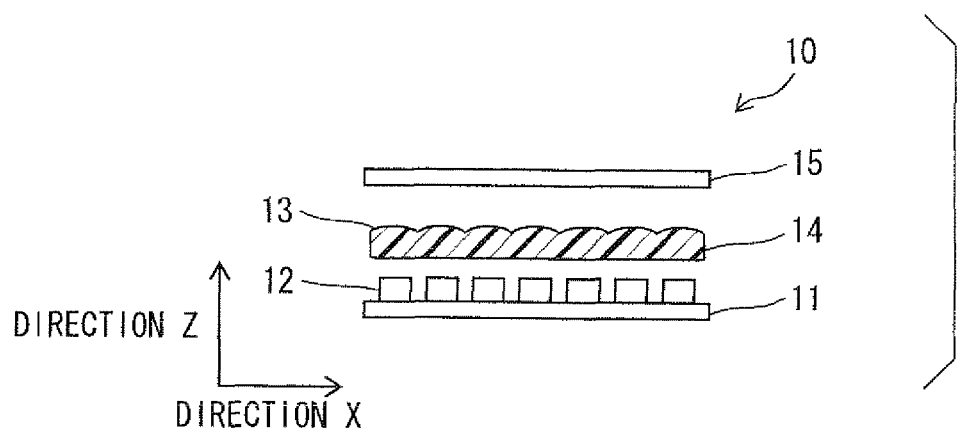
FIG. 2 is a sectional view illustrating a general configuration of a back light in accordance with the embodiment.

As illustrated in FIG. 2, the back light 10 includes the LEDs 12 that are packaged on a circuit board 11, a lens array 14 having lenses 13 that converge the lights irradiated from the LEDs 12 in a one direction, and a diffuser plate 15 that diffuses the light emitted from the lens array 14. An external power is electrically connected to the circuit board 11, and the LED 12 produces luminescence owing to electricity supplied by the circuit board 11. The LEDs 12 are arranged in the direction X at predetermined intervals, and the lenses 13 are arranged also in the direction X corresponding to the LEDs 12. The diffuser plate 15 is obtained as a result of diffusion treatment on one surface of a transparent base, and located in a position opposed to the LEDs 12 with the lens array 14 therebetween. The above-described LED 12 may correspond to a light source, and a light source body may be constituted of the circuit board 11 and the LED 12. Additionally, because the lens array 14 is a feature point of the head up display 100 of the present embodiment, the lens array 14 will be explained in detail hereinafter.

The cylindrical lens 30 is an optical system that serves to concentrate light in a one direction. The cylindrical lens 30 has a hog-backed shape with a cylinder divided in half. A surface of the cylindrical lens 30 opposed to the back light 10 has a flat surface shape, and a reverse face of this opposed surface has a curved surface shape projecting toward the liquid crystal display panel 50. The cylindrical lens 30 is disposed such that a longitudinal direction of the lens 30 is along the direction X, and the light emitted from the back light 10 is collected in the direction Y by the cylindrical lens 30.

The liquid crystal display panel 50 includes a pair of transparent bases (not shown), and a liquid crystal layer (not shown) enclosed between the pair of transparent bases. A transference electrode (not shown) for applying a voltage to the liquid crystal layer is formed on the transparent base, and By controlling the voltage applied to the transparent base, a transmission rate of the light delivered to the liquid crystal layer is controlled for each picture element or for each segment. Therefore, a brightness difference is made in the lights that have passed through the liquid crystal display panel 50, for each picture element or for each segment. As a result, vehicle information, such as a speed of the vehicle, is included in the lights that have passed through the liquid crystal display panel 50. This light including the vehicle information is emitted to the front panel 70.

Operation of the head up display 100 will be described below. When electricity is supplied to the LED 12 from the circuit board 11, the LED 12 emits light so that light is irradiated from the LED 12. The light irradiated from the LED 12 is focused in the direction Z through the lens 13, and then the focused light is diffused by the diffuser plate 15. The diffused light is concentrated in the direction Y through the cylindrical lens 30, and the concentrated light enters into the front panel 70 through the liquid crystal display panel 50. A part of the light which has entered into the front panel 70 is reflected by the front panel 70. The reflected light enters into the pupil of the observer in the vehicle. As described above, the vehicle information is included in the lights that have passed through the liquid crystal display panel 50. Thus, this light including the vehicle information is delivered to the observer via the front panel 70.

In the present embodiment, as above, the back light 10 is disposed further on the cylindrical lens 30-side than the focal point 30f. Accordingly, the light, which a virtual image 10a emits, enters into the observer, with an apparent size of the virtual image 10a made larger than the back light 10. When an apparent emission area is enlarged in this manner, the brightness unevenness included in the light entering into the observer is reduced.

Figure 3:
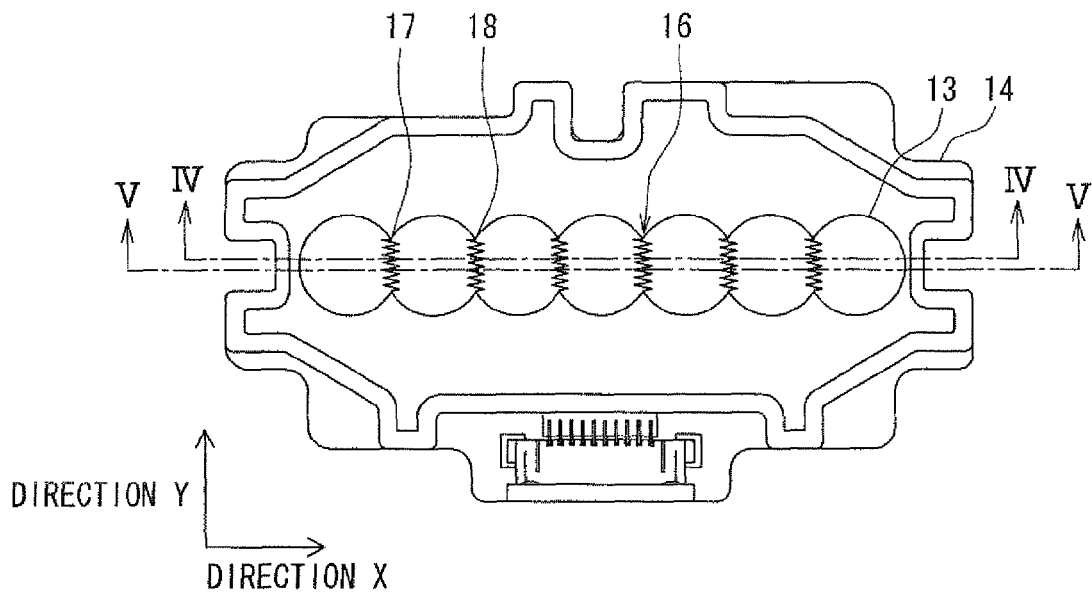
FIG. 3 is a plan view illustrating a general configuration of a lens array in accordance with the embodiment.
Figure 4:
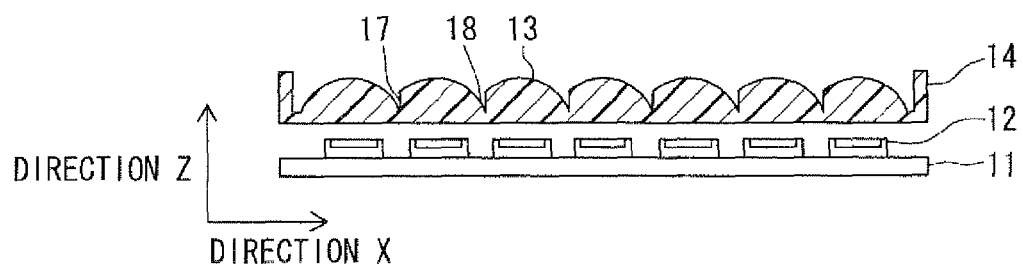
FIG. 4 is a sectional view taken along a line IV-IV in FIG. 3.
Figure 5:
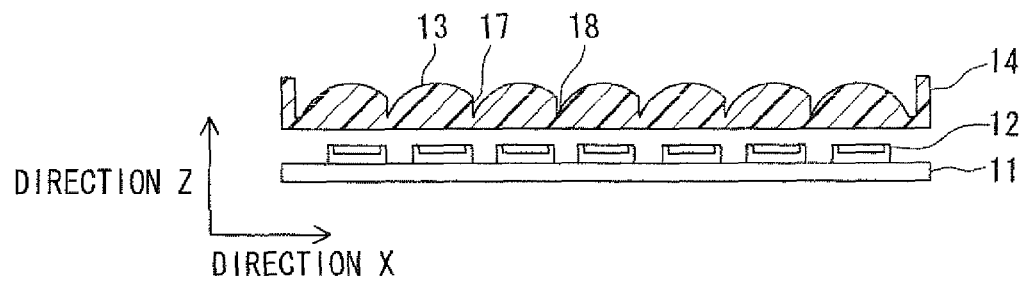
FIG. 5 is a sectional view taken along a line V-V in FIG. 3.

Next, the lens array 14, which is the feature point of the head up display 100 of the present embodiment, will be described below. The lens array 14 is formed as a result of cooling solidification of molten resin after pouring a molten translucent resin material, such as acrylic, into a die. As illustrated in FIGS. 3 to 5, a surface of the lens array 14 opposed to the luminescent surface of the LED 12 has a flat surface shape, A reverse face of this opposed surface is formed such that convex surfaces projecting toward the reverse face are coupled together. One lens 13 is constituted of one convex surface formed on this reverse face, and the convex surfaces are arranged in the direction X corresponding to the LEDs 12. An optical axis of the LED 12 and a vertex of the convex surface (lens 13) coincide with each other. The light condensed through the lens 13 constitutes a brightness distribution with the vertex of the lens 13 being its peak. The light having such a brightness distribution is emitted from each lens 13, and then the observer is irradiated with this light through the liquid crystal display panel 50 and the front panel 70.

As illustrated in FIGS. 3 to 5, a boundary line 16 formed between the two lenses 13 has a V-shaped irregular (concave-convex) shape as a result of the combination of a V-shaped recess 17 that is formed at an end portion of one lens 13 of the two lenses 13, and an inverted V-shaped projection 18 that is formed at an end portion of the other lens 13 of the two lenses 13. A pitch of the recess 17 and the projection 18 that constitute the irregular shape is generally in a range of 0.05 mm to 0.3 mm. The length of 0.3 mm, which is an upper limit of this pitch in size, corresponds to a limit of resolution by a human with the human and an observation object 1 m away from each other (i.e., limit of ability to see two adjacent objects separately).

The brightness distribution of the light emitted from the lens array 14 in the direction Z and measured by the inventor, will be described below in reference to FIGS. 6A to 7B. In graphs of FIGS. 6B and 7B, a vertical axis indicates relative brightness with the highest value of brightness being a reference value, and a horizontal axis indicates the direction X. According to the experimental result, between a case of the boundary line 16 having a linear shape, and a case of the boundary line 16 has the irregular shape, there was little difference in the values of the highest brightness. Therefore, scales of the vertical axes in FIGS. 6B and 7B can be considered to coincide with each other. In addition, the direction X of the lens array in FIG. 6A and the direction X of the graph in FIG. 6B coincide with each other. As well, the direction X of the lens array in FIG. 7A and the direction X of the graph in FIG. 7B coincide with each other.

Figure 6A:
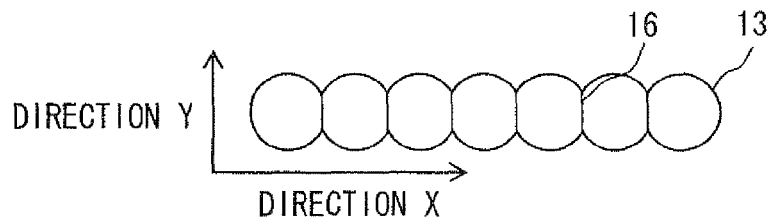
FIG. 6A is a plan view generally showing the lens array to illustrate brightness distribution of light emitted from the lens array in a case of a boundary line between lenses having a linear shape in accordance with the embodiment.
Figure 6B:
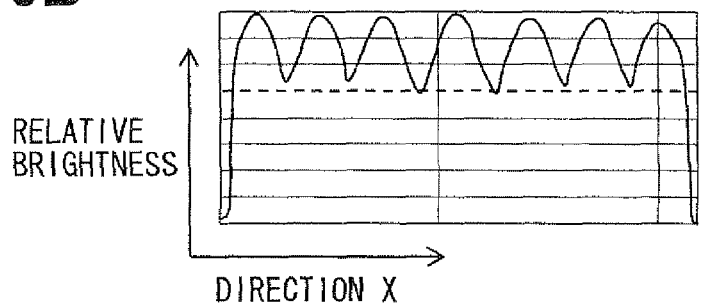
FIG. 6B is a diagram illustrating the brightness distribution of light emitted from the lens array in the case of the boundary line between lenses having a linear shape in accordance with the embodiment.

First, the brightness distribution in the case of the boundary line 16 having a linear shape will be described below with reference to FIG. 6B. In this case, the brightness distribution of light emitted from the lens array 14 is regular in shape. A region having high brightness (hereinafter referred to as a high brightness region) is located at the vertex of each lens 13. A region having low brightness (hereinafter referred to as a low brightness region) is located at the boundary line 16. As above, when the observer observes the light including the brightness distribution, the shape of which is smooth and in which the brightness rapidly changes between the vertex of the lens 13 and the boundary line 16, the observer may recognize the low brightness region as a fringe.

Figure 7A:
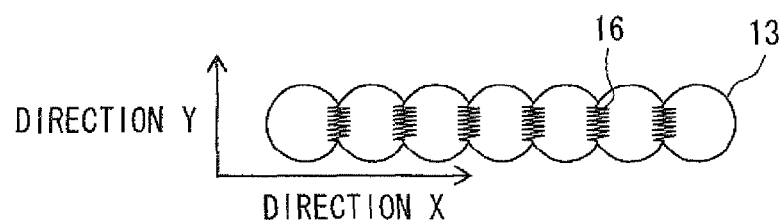
FIG. 7A is a plan view generally showing the lens array to illustrate the brightness distribution of light emitted from the lens array in a case of the boundary line between lenses having an irregular shape in accordance with the embodiment.
Figure 7B:
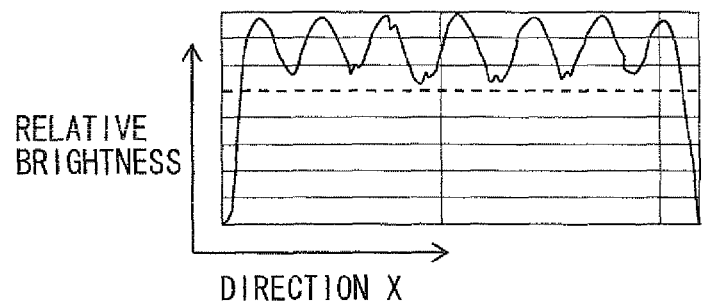
FIG. 7B is a diagram illustrating the brightness distribution of light emitted from the lens array in the case of the boundary line between lenses having an irregular shape in accordance with the embodiment.

Next, the brightness distribution in the case of the boundary line 16 having the irregular shape will be described below in reference to FIG. 7B. In this case, similar to FIG. 6B, the high brightness region is located at the vertex of each lens 13, and the low brightness region is located at the boundary line 16. However, compared to the brightness distribution in FIG. 6B, the shape of the brightness distribution of light is generally disarranged, and the shape of the low brightness region is particularly disordered. Moreover, the brightness of the low brightness region is higher than the brightness of the low brightness region of FIG. 6B. These are because the brightness distribution of light is complicated at the boundary line 16 formed in the irregular shape, and brightness of the boundary line 16 having the irregular shape is thereby averaged.

To describe the above reason in detail, one lens 13 of the two adjacent lenses 13 is hereinafter referred to as the first lens 13, and the other lens 13 of the two adjacent lenses 13 is hereinafter referred to as the second lens 13. In addition, the LED 12 corresponding to the first lens 13 is hereinafter referred to as the first LED 12, and the LED 12 corresponding to the second lens 13 is hereinafter referred to as the second LED 12.

As illustrated in FIGS. 4 and 5, along the boundary line 16, the recess 17 (projection 18) of the first lens 13 and the projection 18 (recess 17) of the second lens 13 are located adjacent to each other. Whereas a bottom part of the recess 17 has a linear shape that is along the direction Z, the projection 18 is formed in a curved shape. In this manner, the first lens 13 and the second lens 13 have different shapes of the boundary line 16 along the direction X, and the first lens 13 and the second lens 13 are asymmetrical in the direction X with the boundary line 16 therebetween. Accordingly, the brightness distributions of the lights emitted respectively from the first lens 13 and the second lens 13 are also asymmetrical in the direction X, so that the shape of the brightness distribution of light is complicated.

Along the boundary line 16 having the irregular shape, a distance between the projection 18 of the first lens 13 and the first LED 12, and a distance between the projection 18 of the second lens 13, which is located adjacent to the projection 18 of the first lens 13 in the direction Y, and the second LED 12, are different. Thus, the brightness difference is caused between the projection 18 of the first lens 13 and the projection 18 of the second lens 13, which is located adjacent to the projection 18 of the first lens 13 in the direction Y. As a result, a light-dark region along the direction Y is formed at the boundary line 16 having the irregular shape. In the present embodiment, a curved surface of the first lens 13, on which the recess 17 is formed, is shorter than a curved surface of the second lens 13 adjacent thereto in the direction X, on which the projection 18 is formed. To put it another way, a first angle that is formed between a line segment connecting the recess 17 of the first lens 13 and the first LED 12 and a line along the direction Z is larger than a second angle made between a line segment connecting the projection 18 of the second lens 13 and the second LED 12 and a line along the direction Z. Therefore, the curve of the recess 17 is further inclined than the curve of the projection 18 adjacent to the recess 17 with respect to the direction Z. For this reason, the amount of light collected in the direction Z at the recess 17 is larger than the amount of light collected in the direction Z at the projection 18. Consequently, a light-dark region along the direction X is formed at the boundary line 16 having the irregular shape. As above, the light-dark region is formed at the boundary line 16 in the direction X and the direction Y, so that the brightness of the boundary line 16 is averaged.

Operation of the head up display 100 of the present embodiment and its effect will be described below. As described above, in the lens array 14 of the present embodiment, the boundary line 16, which is constituted of the two lenses 13, is formed in the irregular shape. Accordingly, the shape of the boundary line 16 is made complex and the brightness distribution of light emitted from the lens array 14 is complicated compared to the case of the boundary line 16 having a linear shape along the entire length of the line 16. Therefore, a shape of the low brightness region, which may be recognized as a fringe, is made indistinct.

At the boundary line 16 having the irregular shape, a distance between the recess 17 of the first lens 13 and the first LED 12 and a distance between the projection 18 of the second lens 13 adjacent to a lateral part of the recess 17 and the second LED 12 are different. Accordingly, a difference is made between brightness of the lateral part of the recess 17 of the first lens 13 and brightness of the projection 18 of the second lens 13 adjacent thereto. As above, light and dark regions are adjacently located along the boundary line 16 having the irregular shape. As a result, the brightness of the boundary line 16 is averaged.

At the boundary line 16 having the irregular shape, the light-dark region is formed at the boundary line 16 in the direction X and the direction Y, so that the brightness of the boundary line 16 is averaged. As a result, the brightness difference formed between the first lens 13 and the second lenses 13 is mitigated, and the inclusion of the brightness unevenness, which may be recognized as a fringe, in the light emitted from the lens array 14 is thereby limited.

Consequently, the failure of the observer being irradiated with the light including the brightness unevenness, which may be recognized as a fringe by the observer, via the liquid crystal display panel 50 and the front panel 70 so that the observer cannot easily visually identify light information displayed on the front panel 70 is inhibited.

More than one recess 17 and more than one projection 18 may be formed, and the boundary line 16 may be formed in a concave-convex (irregular) shape along the entire line 16. Accordingly, compared to configuration of a part of boundary line 16 being formed in the irregular shape, the inclusion of brightness unevenness, which is recognized as a fringe, in the light emitted from the lens array 14 is even further limited.

The head up display 100 may include the diffuser plate 15 for diffusing the light emitted from the lens array 14. Accordingly, the brightness difference included in the light emitted from the lens array 14 is reduced by the diffuser plate 15. Thus, the inclusion of the brightness unevenness, which is recognized as a fringe, in the light emitted from the diffuser plate 15 is restricted.

The embodiment of the invention has been described above. However, the invention is not by any means limited to the above embodiment, and may be embodied through various modifications without departing from the scope of the invention.

In the present embodiment, as illustrated in FIG. 3, the example of the boundary line 16 having the irregular shape throughout the line 16 has been described above. Alternatively, a part of the boundary line 16 may be formed in a concave-convex (irregular) shape.

Figure 8A:
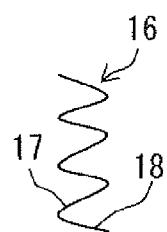
FIG. 8A is a plan view illustrating an arc-shaped boundary line in accordance with a modification on the embodiment.
Figure 8B:
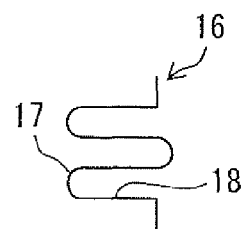
FIG. 8B is a plan view illustrating a U-shaped boundary line in accordance with the modification.
Figure 8C:
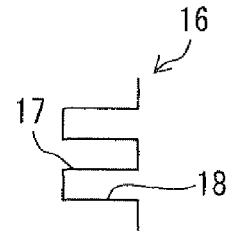
FIG. 8C is a plan view illustrating a rectangular-shaped boundary line in accordance with the modification.

In the present embodiment, the example of the boundary line 16 having a V-shape has been explained above. Nevertheless, the shape of the boundary line 16 is not limited to this example. For instance, an arc-shaped boundary line 16, a U-shaped boundary line 16, or a rectangular-shaped boundary line 16 may be employed as illustrated in FIGS. 8A to 8C. In addition, a human being has the nature that a human being more readily recognizes a linear shape than a curved shape. Therefore, an arc shape may be particularly suitable for the shape of the boundary line 16.

Figure 9:
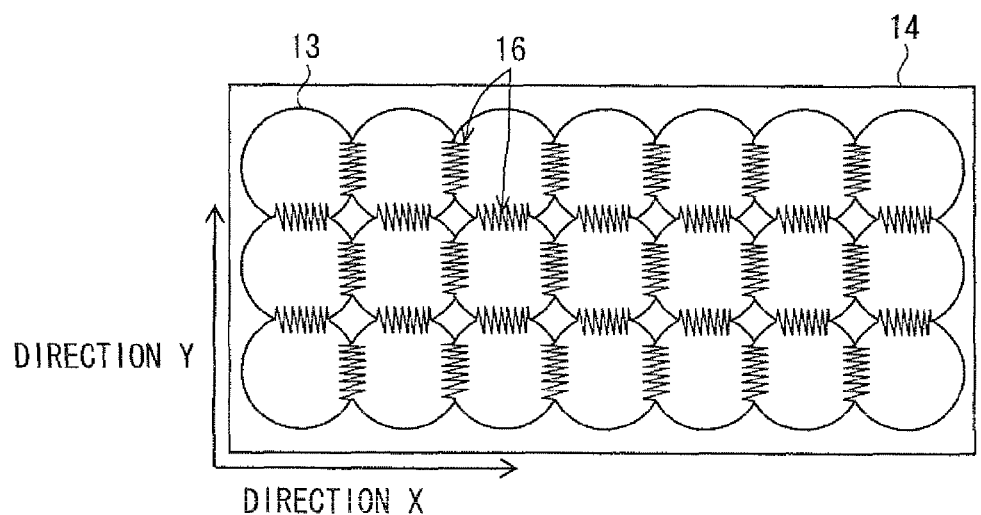
FIG. 9 is a plan view illustrating a lens array in accordance with the modification.

In the present embodiment, the example of formation of the lens 13 in the direction X corresponding to the LED 12 has been explained above. Alternatively, the LEDs 12 may be arranged in the direction X as well as in the direction Y, and the lenses 13 may be arranged in the direction X as well as in the direction Y as illustrated in FIG. 9. In such a case, light is irradiated from the LEDs 12 (lens array 14) in the direction X and in the direction Y. Accordingly, a convex lens is employed as an optical system that collects the light, which is irradiated from the back light 10, instead of the cylindrical lens 30.

In the present embodiment, particular reference has not been made to a positional relationship between an intermediate line, which is located at an intermediate position between the first lens 13 and the second lens 13 in the direction X, and the boundary line 16. However, the light-dark region is formed at the boundary line 16, even if the boundary line 16 is located in the intermediate line, or even if the boundary line 16 is located on the one lens 13-side of the intermediate line.

If the boundary line 16 is located in the intermediate line, for example, the bottom part of the recess 17 of the first lens 13 and an end of the projection 18 of the second lens 13 are located on the first lens 13-side of the intermediate line. Accordingly, a distance between the bottom part of the recess 17 of the first lens 13 and the first LED 12 is smaller than a distance between the end of the projection 18 of the second lens 13 and the second LED 12. As a result, the amount of light entering into the bottom part of the recess 17 of the first lens 13 from the first LED 12 is larger than the amount of light entering into the end of the projection 18 of the second lens 13 from the second LED 12.

On the other hand, an end of the projection 18 of the first lens 13 and a bottom part of the recess 17 of the second lens 13 are located on the second lens 13-side of the intermediate line. Accordingly, a distance between the end of the projection 18 of the first lens 13 and the first LED 12 is larger than a distance between the bottom part of the recess 17 of the second lens 13 and the second LED 12. As a result, the amount of light entering into the end of the projection 18 of the first lens 13 from the first LED 12 is smaller than the amount of light entering into the bottom part of the recess 17 of the second lens 13 from the second LED 12. As described above, in the case of the boundary line 16 being located in the intermediate line as well, the light-dark region is formed at the boundary line 16 in the direction X.

As a matter of course, in the above-described case as well, along the boundary line 16 having the irregular shape, a distance between the projection 18 of the first lens 13 and the first LED 12, and a distance between the projection 18 of the second lens 13, which is located adjacent to the projection 18 of the first lens 13 in the direction Y, and the second LED 12, are different. Consequently, the light-dark region along the direction Y is formed at the boundary line 16 having the irregular shape.

Additionally, when the boundary line 16 is located on the first lens 13-side of the intermediate line, i.e., when the intermediate line is located on the second lens 13-side of the boundary line 16, for example, the recess 17 (projection 18) of the first lens 13 and the projection 18 (recess 17) of the second lens 13 are located on the first lens 13-side of the intermediate line. Hence, a distance between the recess 17 (projection 18) of the first lens 13 and the first LED 12 is smaller than a distance between the projection 18 (recess 17) of the second lens 13 and the second LED 12. As a result, the amount of light entering into the recess 17 (projection 18) of the first lens 13 from the first LED 12 is larger than the amount of light entering into the projection 18 (recess 17) of the second lens 13 from the second LED 12. As described above, in the case of the boundary line 16 being located on the first lens 13-side of the intermediate line as well, the light-dark region is formed at the boundary line 16 in the direction X.

As a matter of course, in the above-described case as well, along the boundary line 16 having the irregular shape, a distance between the projection 18 of the first lens 13 and the first LED 12, and a distance between the projection 18 of the second lens 13, which is located adjacent to the projection 18 of the first lens 13 in the direction Y, and the second LED 12, are different. Consequently, the light-dark region along the direction Y is formed at the boundary line 16 having the irregular shape.

Additional advantages and modifications will readily occur to those skilled in the art. The invention in its broader terms is therefore not limited to the specific details, representative apparatus, and illustrative examples shown and described.

What is claimed is:

1. An illuminating device comprising:
   a light source body that includes a plurality of light sources; and
   a lens array that includes:
   an opposed surface that is opposed to the light source body;
   a reverse surface that is on a reverse side of the opposed surface;
   a plurality of lenses, which correspond respectively to the plurality of light sources, the plurality of lenses including:
   a first lens that has a first curved surface, which is formed on the reverse surface and projects on the reverse side; and
   a second lens that is located adjacent to the first lens and has a second curved surface, which is formed on the reverse surface and projects on the reverse side;
   a recess that is formed at an end portion of the first lens adjacent to the second lens; and
   a projection that is formed at an end portion of the second lens, wherein the projection of the second lens is received in the recess of the first lens.

2. The illuminating device according to claim 1, wherein:
   the recess is one of a plurality of recesses;
   the projection is one of a plurality of projections; and
   the projections and recesses are formed along an entire length of the boundary line.

3. The illuminating device according to claim 1, wherein the projection is arc-shaped.

4. The illuminating device according to claim 1, wherein the projection is U-shaped.

5. The illuminating device according to claim 1, wherein the projection is V-shaped.

6. The illuminating device according to claim 1, wherein the projection is rectangular shaped.

7. The illuminating device according to claim 1, further comprising a diffuser plate that is configured to diffuse light emitted from the lens array.

8. The illuminating device according to claim 1, wherein:
   the illuminating device is a head up display that is adapted to be disposed in a vehicle having a front panel;
   the head up display includes a liquid crystal display panel that is configured to control a transmission rate of light for each picture element or for each segment; and
   the head up display is adapted to be disposed in the vehicle such that the front panel is irradiated with light, which is emitted from the lens array, through the liquid crystal display panel, and then the light reflected by the front panel is delivered to a pupil of an observer in the vehicle.

9. The illuminating device according to claim 1, wherein a plurality of alternating projections and recesses are formed along the end portion of the first lens and a plurality of alternating projections and recesses are formed along the end portion of the second lens, wherein the projections on the first lens are received in the recesses of the second lens, and wherein the projections on the second lens are received in the recesses of the first lens.

10. The illuminating device according to claim 9, wherein the projections on the end portions of the first and second lenses are arcuate-shaped.

11. The illuminating device according to claim 9, wherein the projections on the end portions of the first and second lenses are U-shaped.

12. The illuminating device according to claim 9, wherein the projections on the end portions of the first and second lenses are V-shaped.

13. The illuminating device according to claim 9, wherein the projections on the end portions of the first and second lenses are rectangular-shaped.

* * * * *